UNITED STATES PATENT OFFICE.

JOKICHI TAKAMINE, OF CHICAGO, ILLINOIS.

PREPARING AND MAKING TAKA-MOYASHI.

SPECIFICATION forming part of Letters Patent No. 525,822, dated September 11, 1894.

Application filed June 18, 1891. Serial No. 396,706. (No specimens.) Patented in England April 2, 1891, No. 5,700, and October 12, 1891, No. 17,374; in France April 13, 1891, No. 214,033, and October 19, 1891, No. 216,840; in Belgium April 14, 1891, No. 94,522, and October 24, 1891, No. 96,937; in Canada December 12, 1891, Nos. 37,961 and 37,962, and in Austria-Hungary July 2, 1892, No. 40,399, and September 28, 1892, No. 16,519.

*To all whom it may concern:*

Be it known that I, JOKICHI TAKAMINE, a subject of the Emperor of Japan, residing at Chicago, in the county of Cook and State of Illinois, have invented a new and useful Improvement in Preparing and Making Taka-Moyashi, of which the following is a specification, and for which I have secured patents in foreign countries as follows: Canada, Nos. 37,961 and 37,962, dated December 12, 1891; Belgium, No. 94,522, dated April 14, 1891, and No. 96,937, dated October 24, 1891; France, No. 214,033, dated April 13, 1891, and No. 216,840, dated October 19, 1891; Austria-Hungary, No. 40,399, dated July 2, 1892, and No. 16,519, dated September 28, 1892, and Great Britain, No. 5,700, dated April 2, 1891, and No. 17,374, dated October 12, 1891.

The object of my invention is to grow and prepare the matured spores of microscopic mycelial fungi, which, when sown on suitable material, have the property of producing diastase and ferment cells in a purer, healthier and more efficient condition and more economically than by the present process employed for producing tane-koji or moyashi (*Eurotium oryzæ*, Ahlburg) by the preparation and employment of a definite, artificial food on substances upon which the fungous plant may be grown and developed, and also to preserve these matured seed or spores of fungi thus produced in a healthier condition for a longer period of time than has heretofore been done.

Tane-koji (or seed koji) or moyashi is a term that has been heretofore applied to a yellowish green moldy mass, consisting of steamed rice covered with a microscopical mycelial fungus (*Eurotium oryzæ*, Ahlburg), which sown on steamed rice and developed to a certain stage, produces both diastatic and fermenting properties. It has a yellowish green moldy appearance. Sometimes, though rarely, the yellowish green powder shaken off from the above mentioned mass is also called tane-koji.

In preparing tane-koji or moyashi (as above defined) by the old process, hulled semi-cleaned rice is first steamed until the starch cells are open. It is then mixed with the ashes of trees. The rice thus mixed with tree ashes is thoroughly mixed with a proper quantity of tane-koji or moyashi at a temperature of from 20° to 30° centigrade, and bedded up and allowed to remain for from twenty-four to thirty-six hours, when it is divided into small portions and placed in trays and kept under proper manipulation, temperature and humidity, until the fungus is abundantly reproduced and is sufficiently matured. The yellowish green moldy substance thus obtained is the tane koji or moyashi of commerce. For transportation this article is simply placed in paper bags and for preservation it is kept in a cold dry place in paper bags and sealed pots.

The objections and disadvantages of the old process are as follows; viz:

First. The composition of the tree ashes applied to the steamed rice being variable, varying even with the different parts of the same tree, a supply of the mineral ingredients in the proper proportions and quantities is not obtained.

Second. Tree ashes being wholly deficient in nitrogenous ingredients, which are the most essential for the healthy and abundant growth of the fungus, a supply of these important ingredients is also not obtained.

Third. The substance on which tane-koji or moyashi is grown is limited to rice alone and the only fungus employed has been the *Eurotium oryzæ* (Ahlburg).

Fourth. During the process of preservation and transportation the moisture in the article itself and in the air and also the injurious microbes in the air react on the starch sugars, &c., contained in the tane-koji or moyashi and produce acid fermentation, and other injurious fermentations causing the decay of the tane koji or moyashi and making it unfit for use. Consequently the preservation for any length of time the tane koji or moyashi, or its transportation for long distances without damage was impossible.

I discovered that the other mold fungi, belonging to the genus *Aspergillus*, and others included in the genera *Mucor* and *Pencillium*, possessed the function of producing diastase and ferment cells, and therefore I do not confine myself in this application, to any particular fungus, but include all of the mycelial fungi belonging to the genera, and possessing the properties above mentioned.

I discovered that the mold fungi above mentioned reproduce, grow and flourish in their highest activity by supplying the proper ingredients for their nourishment in the proper quantities and proportions. Otherwise the mold fungi are unhealthy and less productive. I also discovered that these proportions and quantities of the ingredients to be supplied vary with the different kinds of bran or other substances employed for growing the fungi, and that, the fungus grows best in a composition which has an alkaline reaction after being mixed and combined. The ingredients necessary for the healthy and abundant growth of the fungi are: first, ammonium salts, such as ammonium tartrate or ammonium acetate, or nitrogenous substances such as gluten, albumen or gelatine; second, potassium salts, preferably potassium sulphate, or potassium phosphate; third, magnesium salts, preferably magnesium sulphate; fourth, calcium salts, preferably calcium sulphate or calcium phosphate; fifth, phosphates preferably calcium or potassium phosphates.

The above ingredients are mixed and combined in such proportions that in each ingredient its principal component such as for instance, potassium oxide ($K_2O$) in potassium sulphates ($K_2SO_4$)—is represented in about the following quantities:—twenty-five to thirty-five parts of potassium oxide ($K_2O$) calculated from the above mentioned salts; ten to thirty parts of calcium oxide (CaO) calculated from the above mentioned salts; ten to thirty parts of magnesium oxide (MgO) calculated from above mentioned salts; fifty to seventy parts of phosphoric acid ($P_2O_5$) calculated from the above mentioned salts; two to ten parts of nitrogen (N.) (contained in ammonium salts or nitrogenous substances) calculated from the above mentioned salts or substances.

The above composition is made to have an alkaline reaction by adding alkalies or alkaline earths, such as potassium hydrate or carbonate, calcium hydrate, &c.

The quantity and proportion of the ingredients to be used vary with the different kinds of cereals or other substances employed, and may be one per cent., two per cent., three per cent., four per cent., &c., of the weight of the cereals or other substances used.

Any grain, such as corn, wheat, barley, &c., or substances which supply the necessary ingredients for the growth of the fungi, such as slop (solid portions) from alcoholic distillation, slop (solid portion) or grain from beer brewing, bran and slop from glucose works and starch factories, any bran, such as wheat or corn bran, sawdust, corn cobs, chopped straw, crash or other fabric, saturated with the above mentioned slop, or albuminoid substances (glute, &c.,) or other nourishing substances may be used for cultivating the above mold fungi. These several substances when treated and fertilized by the nutritive ingredients hereinbefore described and in the proportions specified are equivalents, and possess the nutritive power of growing and developing the mycelial fungi to their greatest perfection.

The proportions of the ingredients in the above formula may be varied somewhat, depending upon the particular grain or other substances used.

The several grains, such as corn, wheat, barley, &c., and other substances, such as slop, bran, crash or other fabrics saturated with slop, &c., have been analyzed and their chemical constituents are known and the variation in the proportion of the above formula should be made to supply a particular grain or other substance with any of the several chemical elements in which it may be more or less deficient.

For rice the first column of figures, in the above formula set out, represents the proper proportions. Corn requires a greater proportion of phosphoric acid and ammonium salts, or nitrogenous substances. The same grains and any other substances may vary somewhat, and the most useful and successful results depend upon the experience and observation of the operator and chemist in determining the proportions.

I do not limit myself to the exact ingredients mentioned as there are other elements which may be regarded as the chemical equivalents of the ingredients named and which may perform suitably the same functions in connection with the other ingredients, such as sodium salts may be substituted for potassium salts and strontium salts may be used instead of calcium salts, &c. These ingredients may be dissolved in water and sprayed over the cereals or other substances named above, uniformly before or after being steamed; or the cereals or other substances (either before or after being steamed) may be plunged into the solution made to a proper strength or these ingredients may be mixed with inert hygroscopic substances, such as starch, &c., so as to increase the volume and sprinkled uniformly over and well mixed with the cereals and other substances used before or after being steamed.

The cereals, &c., having been impregnated with the above described composition (either before or after being steamed, sufficiently to open the starch cells or for sterilization) the mass is cooled down to a temperature of about 15° to 30° centigrade, when about one-fifty thousandth part in weight of the cereals or other substances used of the matured seed mycelial fungi is added and well mixed.

The mass is bedded up and allowed to remain for about six hours when the same quantity of matured seed as at first is added, and thoroughly mixed again. After about eighteen hours, the mass is divided into small portions and allowed to remain about five hours longer, when it is spread out into thin layers in a room where the temperature ranges from about 15° to 30° centigrade and a proper degree of humidity and supply of fresh air is secured. At the expiration of about from three to six days the mass will be found to be covered with an abundant growth of fully matured fungus. It is then taken out of the growing room and is ready for immediate use. Or the mass may be dried and the matured seed may be separated from the mass of cereals or other substances on which it was grown, and after being thoroughly desiccated at a low temperature, preserved in air tight vessels. By this means a better and more uniformly matured seed of the fungi is obtained than by the old method used in making tane-koji or moyashi.

The mass thus obtained by the above described process has a moldy appearance and will be of a color depending largely upon the cereals or other substances on which it is grown, and also upon the fungus employed. This matured fungus when sown on suitable nourishing substances and developed to a certain stage develops diastatic and fermenting properties, and for these properties it is valuable for use in the arts of converting starch into sugars, alcoholic fermentation and kindred industries.

The taka-moyashi is dried, either by desiccating substances, such as strong sulphuric acid, or anhydrous calcium chloride, in the usual desiccating process, preferably at a temperature below 20° centigrade, or by passing a current of dry air below 20° centigrade, through it. Then it is sifted through a fine sieve and the grain or other substance on which it is grown, is separated from the matured spores of mycelial fungi, which is pure taka-moyashi in the form of a fine powder. The powder thus prepared is again dried by the above process and is sealed in an air tight vessel or is mixed with inert and at the same time, hygroscopic substances, such as roasted starch. The object in mixing these ingredients is two fold: first, to increase the volume so as to be convenient for sprinkling over the cereals, bran, or other substances; second, to keep the matured seed mycelial fungi always dry, to prevent any possibility of a change from a dormant state to a state of activity; or the powder when kept in sealed vessels, may be surrounded by the above mentioned hygroscopic substances to prevent the absorption of moisture. The mass containing matured seed or spores thus prepared I call generically "taka-moyashi" to distinguish it from the ordinary moyashi or tane-koji and when separated from the mass either mixed or not with inert and at the same time hygroscopic substances, I call it "pure taka-moyashi."

It is evident that the only distinction between the taka-moyashi and the pure taka moyashi consists in the fact that in the latter the spores or seed of the fungus are separated; while in the former they permeate the mass on and in which the fungus has grown and been developed.

The taka-moyashi possesses to a slight extent both diastase and fermenting properties, but the pure taka-moyashi possessed only a slight fermenting property, and each is practically useless in the arts for either purpose; the spores or seed being the matured seed or spores capable of being sown to reproduce themselves as other seed or of being developed into taka-koji and taka moto.

I have pending in the United States Patent Office applications, Serial No. 396,611, filed June 17, 1891, in which the process of making and developing taka-koji is fully described and claimed, and Serial No 396,705, filed June 13, 1891, in which the process of making and developing taka-moto is described and claimed.

Having thus described my invention, what I claim as new, and desire to secure by Letters Patent of the United States, is—

1. The process of preparing and making taka-moyashi which consists, first, in impregnating or saturating a mass of bran, such as the bran of ordinary cereals, with a defined artificial nutriment or fertilizer of the following composition: (1)—ammonium salts, such as ammonium tartrate; (2)—potassium salts, preferably potassium sulphate; (3)—magnesium salts, preferably magnesium sulphate; (4)—calcium salts, preferably calcium sulphate; (5)—phosphates, preferably calcium phosphates, and, (6)—alkalies in quantities to produce alkaline reaction; second, steaming and heating said mass of bran; third, sowing and incubating the spores of the mycelial fungus upon said mass of nourishing substance; fourth, subjecting said mass thus prepared and treated to the proper manipulations and temperatures for the reproduction and perfect growth of the fungus to its full maturity; all substantially as described.

2. The process of preparing and making pure taka-moyashi which consists, first, in impregnating or saturating a mass of bran, such as the bran of ordinary cereals, with a defined artificial nourishment or fertilizer of the following composition: (1)—ammonium salts, such as ammonium tartrate; (2)—potassium salts, preferably potassium sulphate; (3)—magnesium salts, preferably magnesium sulphate; (4)—calcium salts, preferably calcium sulphate; (5)—phosphates, preferably calcium phosphates, and, (6)—alkalies in quantities to produce alkaline reaction; second, steaming and heating said mass of bran; third, sowing and incubating the spores of the mycelial fungus upon said mass of nourishing substance; fourth, subjecting said mass thus prepared and treated to the proper manipulations and temperatures for the reproduction and proper growth of the fungus to its full maturity; fifth, thoroughly desiccating the mass with this growth of fungus and separating the spores or seeds therefrom in the form of a powder; all substantially as described.

3. The process of preserving the matured seed or spores of the mycelial fungus which consists in thoroughly drying the spores; mixing the said spores with inert and at the same time hygroscopic substances; all substantially as described.

4. As an article of commerce taka-moyashi consisting of a mass of bran of the cereals which is impregnated and fertilized by a defined artificial food or fertilizer of the following composition: (1)—nitrogenous substances; (2)—potassium salts; (3)—magnesium salts; (4)—calcium salts; (5)—phosphates; in the proportions specified and made alkaline with alkaline earths; and which mass is permeated with the matured growth of the fungus grown thereon; substantially as described.

5. As an article of commerce pure taka moyashi consisting of the separated spores or seeds of the mycelial fungus impregnated by natural growth and assimilation with a nutriment fertilized with a defined artificial composition as follows:—(1)—nitrogenous substances; (2)—potassium salts; (3)—magnesium salts; (4)—calcium salts; (5)—phosphates; in the specified proportion and made alkaline with alkaline earths; and mixed with inert and at the same time hygroscopic substances; all substantially as described.

JOKICHI TAKAMINE.

Witnesses:
E. V. HITCH,
E. MOONE.